United States Patent
Barney

(10) Patent No.: US 6,301,549 B1
(45) Date of Patent: Oct. 9, 2001

(54) THREE DIMENSIONAL OBJECT BOUNDARY AND MOTION DETERMINATION DEVICE AND METHOD OF OPERATION THEREOF

(75) Inventor: Matthew F. Barney, Bowling Green, OH (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/105,750

(22) Filed: Jun. 26, 1998

(51) Int. Cl.[7] ............................. G01N 21/01; G01B 11/03
(52) U.S. Cl. ................ 702/167; 702/159; 250/559.22; 356/2; 356/4.01
(58) Field of Search ............................ 702/150, 151, 702/152, 153, 155, 159, 167; 250/559.19, 559.22, 559.29, 559.37; 356/2, 3, 4.01, 337, 138, 372

(56) References Cited

U.S. PATENT DOCUMENTS

| 5,446,529 | | 8/1995 | Stettner et al. | 356/4.01 |
| 5,652,658 | | 7/1997 | Jackson et al. | 356/398 |
| 5,661,667 | | 8/1997 | Rueb et al. | 364/525 |
| 5,675,377 | * | 10/1997 | Gibas | 348/47 |
| 5,712,803 | * | 1/1998 | Garuet-Lempirou | 364/560 |
| 5,714,762 | * | 2/1998 | Li et al. | 250/559.2 |
| 5,747,822 | * | 5/1998 | Sinclair et al. | 250/559.19 |
| 5,748,321 | * | 5/1998 | Burks et al. | 356/386 |
| 5,805,289 | * | 9/1998 | Corby, Jr. et al. | 356/376 |
| 5,850,370 | * | 12/1998 | Stringer et al. | 367/128 |
| 5,889,550 | * | 3/1999 | Reynolds | 348/139 |
| 5,892,538 | * | 4/1999 | Gibas | 348/43 |
| 5,903,354 | * | 5/1999 | Bengala et al. | 356/380 |
| 5,911,126 | * | 6/1999 | Massen | 702/153 |
| 5,917,655 | * | 6/1999 | Lehnen et al. | 359/625 |
| 5,946,645 | * | 8/1999 | Rioux et al. | 702/155 |
| 5,973,788 | * | 10/1999 | Pettersen et al. | 356/375 |
| 5,982,493 | * | 11/1999 | Lehnen et al. | 356/375 |
| 6,011,255 | * | 1/2000 | Rueb et al. | 250/234 |
| 6,061,644 | * | 5/2000 | Leis | 702/153 |
| 6,061,645 | * | 5/2000 | Bengala et al. | 702/156 |
| 6,069,700 | * | 5/2000 | Rudnick et al. | 356/359 |
| 6,081,273 | * | 6/2000 | Weng et al. | 345/425 |

OTHER PUBLICATIONS

Phansalkar et al., "On Generating Solid Models of Mechanical Parts through Fuzzy Clustering", IEEE, Apr./1997.*
Overview and specification for "RealScan 3D"; 4 pages; Mar. 4, 1998.

* cited by examiner

Primary Examiner—Patrick Assouad

(57) ABSTRACT

A device for determining at least a portion of a convex boundary of an object and a method of operating the same to determine the convex boundary or motion thereof. In one embodiment, the device includes: (1) first, second and third sensors, locatable about the object, that scan the object in corresponding first, second and third dimensions and produce signals indicating boundary sections in corresponding first, second and third planes and (2) a boundary integrator, coupled to the first, second and third sensors, that combines the signals to develop therefrom the convex boundary.

14 Claims, 3 Drawing Sheets

THREE DIMENSIONAL OBJECT BOUNDARY AND MOTION DETERMINATION DEVICE AND METHOD OF OPERATION THEREOF

TECHNICAL FIELD OF THE INVENTION

The present invention is directed, in general, to object mapping and time and motion study and, more specifically, to an object boundary and motion determination device that operates in three dimensions and a method of operating the same to gather data concerning a behavioral pattern of an object.

BACKGROUND OF THE INVENTION

Physical performance training is highly effective when a student can observe an instructor or human subject matter expert model a desired behavioral pattern. Stimuli are most rich when the instructor is able to demonstrate the behavioral pattern such that the student can observe from many different angles. Physical tasks, such as manual labor tasks (e.g., firefighting), sports (e.g., baseball), delicate dexterity-based tasks (e.g., neurosurgery, obstetrics), self-defense techniques (e.g., martial arts), dance (e.g., ballet, folk dancing), manual manipulation of genetic material, and manual manipulation of atoms (using a scanning tunneling microscope), typically require one-on-one contact with the instructor. The instructor may assess the student's performance of the physical task and provide the feedback necessary for the student to master the physical task.

Assessment of physical behaviors for psychological research, performance appraisal, or physical training course evaluation is typically time consuming, laborious, and highly obtrusive. One threat to the validity of most experimentally-designed psychology studies is the inevitability of demand characteristics, a change in a subject's behavior brought about by the subject's awareness of the study. The characteristics of the study setting, in effect, demands a different sort of behavior than would have been elicited naturally. Additionally, collecting behavioral data is labor intensive, often requiring a person to tally and/or to interpret the behavior. Social science research, therefore, is often limited in scope to situations that are relatively convenient. For example, research assistants typically conduct behavioral analysis for no longer than eight hours at a time. An automated approach to physical behavior studies capable of running continuously for a number of days or weeks may be desirable to improve the scope of the study. Additionally, studies that do not involve the subject's proximal awareness, or at least avoid constant reminders that the subject's behavior is under examination may potentially eliminate the demand characteristics.

Modern workplaces may contain many assessment and training situations where either non-reactive measures are desired, physical labor cannot be avoided, behaviors may need to be highly refined, or where behavioral errors may be very costly. Organizations that rely heavily on physical abilities (e.g., professional sports, law enforcement, medical practices) may desire such an automated approach.

Accordingly, what is needed in the art is a device for examining an object to determine its behavioral pattern, employable in assessment and training situations.

SUMMARY OF THE INVENTION

To address the above-discussed deficiencies of the prior art, the present invention provides a device for determining at least a portion of a convex boundary of an object and a method of operating the same to determine the convex boundary or motion thereof. In one embodiment, the device includes: (1) first, second and third sensors, locatable about the object, that scan the object in corresponding first, second and third dimensions and produce signals indicating boundary sections in corresponding first, second and third planes and (2) a boundary integrator, coupled to the first, second and third sensors, that combines the signals to develop therefrom the convex boundary.

The present invention therefore introduces the broad concept of determining the position of an object by determining its convex boundary. Once determined, the object's position can be used to study its motion or, at a higher level of abstraction, its behavior. If the object is a human being, its behavior can be employed to train and assess skills and/or task performance.

In one embodiment of the present invention, the first, second and third sensors gather energy transmitted past the object. In this embodiment, energy (such as light) emitters (e.g., lasers) scan the object. The object blocks energy that attempts to pass through it and passes any energy that falls outside its convex boundary. Sensors gather the energy, which takes the form of a shadow, indicating the convex boundary. Shadows in different dimensions can then be combined to yield an indication of the object's overall convex boundary.

In one embodiment of the present invention, the first, second and third sensors gather energy reflected from the object, the device capable of detecting concavities in the convex boundary. Those skilled in the art are familiar with rangefinders that operate on reflected energy (such as laser rangefinders). The present invention can advantageously operate with such rangefinders. In addition to determining an object's convex boundary, rangefinders can determine concavities, yielding a more complete indication of the object's overall position.

In one embodiment of the present invention, each of the first, second and third sensors comprises a grid of sensing elements. Alternatively, each of the first, second and third sensors may comprise individual translatable sensing elements that move as required to gather the necessary boundary data.

In one embodiment of the present invention, the boundary integrator repeatedly combines the signals to determine changes in the convex boundary over time, the device capable of determining motion of the object. Thus, the present invention can operate in four dimensions to yield motion and, as stated previously, behavior.

In one embodiment of the present invention, the device further includes: (1) a memory device that contains stored convex boundary data and (2) a boundary correlator that correlates the convex boundary with the stored convex boundary data. In an embodiment to be illustrated and described; correlation of the convex boundary with the stored convex boundary data can yield valuable information concerning compliance and skill, improving training time.

In a more specific embodiment, the device further includes a display device that displays a correlation between the convex boundary and the stored convex boundary data. The display device may be a conventional screen or a virtual reality headset, as a particular application may find advantageous.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

DESCRIPTION OF THE DRAWINGS

For a more complete understanding of the present invention, reference is now made to the following descriptions taken in conjunction with the accompanying drawings, in which.

DETAILED DESCRIPTION

Figure 1:
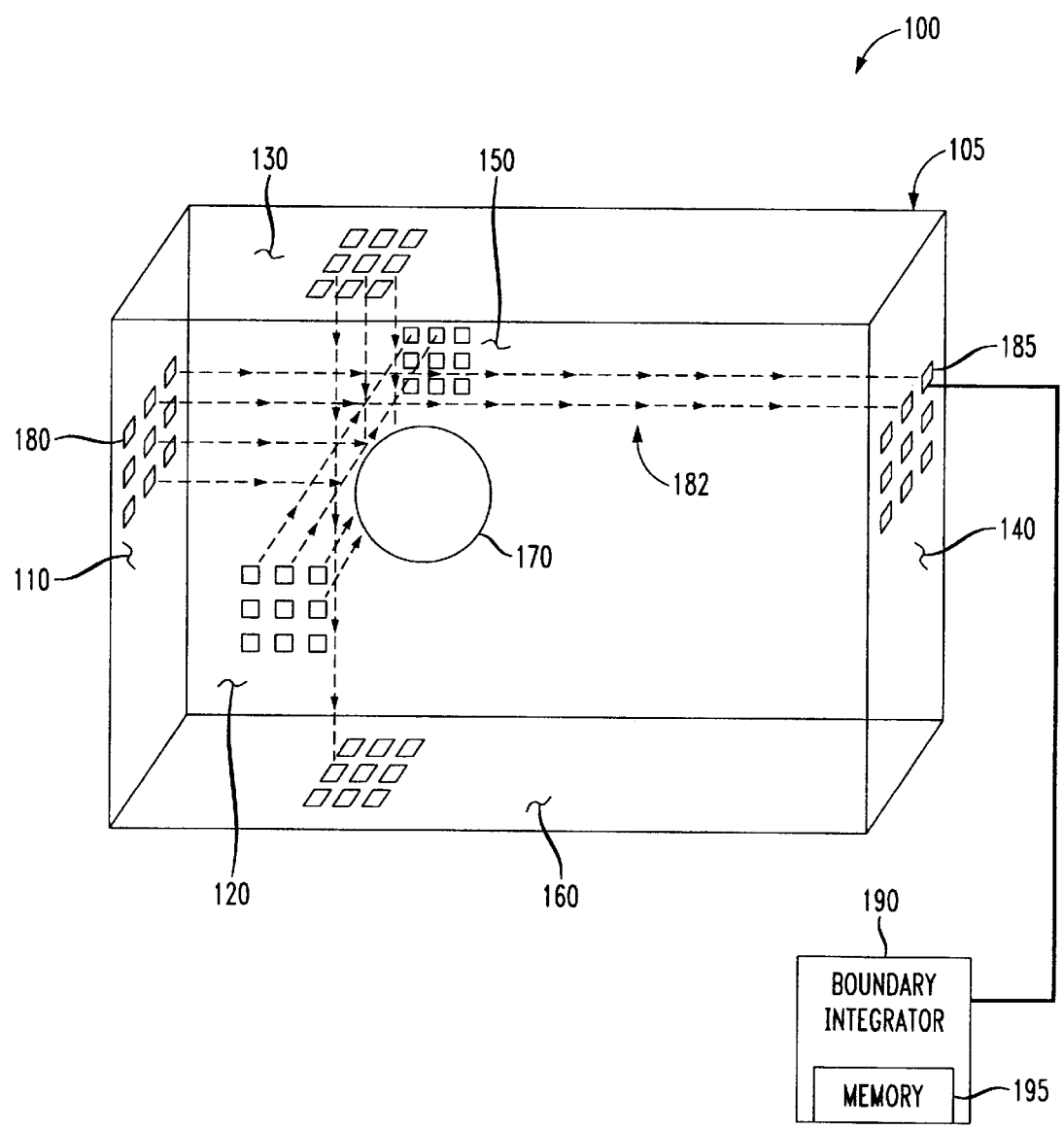
FIG. 1 illustrates an embodiment of a boundary determination device constructed according to the principles of the present invention.

Referring initially to FIG. 1, illustrated is an embodiment of a boundary determination device 100 constructed according to the principles of the present invention. The device 100 includes an essentially cubical structure 105 having first, second, and third orthogonal side surfaces 110, 120, 130, and corresponding opposing fourth, fifth, and sixth side surfaces 140, 150, 160, respectively. An object 170 (such as a ball), having a convex boundary, is located within the device 100. In the illustrated embodiment, the structure 105 is illustrated as a cube. Those skilled in the art will realize, however, that the structure 105 may be of any geometry.

The first, second, and third surfaces 110, 120, 130 contain first, second, and third energy emitters. In the illustrated embodiment, the first, second, and third energy emitters each consists of a grid of light emitters or lasers, (one of which is designated 180). The fourth, fifth, and sixth surfaces 140, 150, 160 contain first, second, and third sensors, respectively. In the illustrated embodiment, the first, second, and third sensors are light sensors, each consisting of a grid of light sensing elements or photodetectors (one of which is designated 185).

The lasers 180 of the first, second, and third surfaces 110, 120, 130 are arranged such that each photodetector 185 corresponds to a laser 180 and receives light therefrom. The lasers 180 and photodetectors 185 are thus located about the object and may illuminate the object 170 in first, second, and third dimensions to produce signals indicating boundary sections in corresponding first, second, and third planes. Of course, an optimal number of lasers 180 and corresponding photodetectors 185 per square inch may exist for different applications depending on precision requirements and cost constraints. While the illustrated embodiment contains lasers 180 and photodetectors 185, those skilled in the art will realize that the use of other types of energy emitters and corresponding sensors are well within the broad scope of the present invention. Additionally, translatable sensing elements that move as required to gather the necessary boundary data may be used in place of the grid of light sensing elements.

The device 100 further includes a boundary integrator 190, coupled to the photodetectors 185 of the first, second, and third sensors. The boundary integrator 190 combines signals received from the photodetectors 185 and develops therefrom a three-dimensional convex boundary of the object 170. In the illustrated embodiment, the boundary integrator 190 is a computer and includes a memory device 195 containing a database of stored convex boundary data. The boundary integrator 190 may thus store, retrieve, and analyze the convex boundary data. Of course, the memory device 195 may also be separate from the boundary integrator 190.

The device 100 operates as follows. The object 170 blocks energy (such as light) beams (one of which is designated 182) from a number of lasers 180 from reaching the corresponding photodetectors 185. The photodetectors 185 gather energy transmitted past the object 170. The object 170, therefore, causes a shadow to form on each grid of photodetectors 185, thereby indicating its convex boundary in that plane. The boundary integrator 190 then combines the data received from the photodetectors 185 to determine a three-dimensional convex boundary of the object 170. In one embodiment of the present invention, the database contains a field for each position in three-dimensional space. The boundary integrator 190 may then record a logic one in the field if the position is occupied by the object 170. Otherwise, the boundary integrator 190 records a logic zero in the field. Of course, other methods of indicating whether the position is occupied may also be used. The database may thus contain a point by point map of the object 170 in three-dimensional space.

While the device 100 has been illustrated as having a cubical structure, those skilled in the art will realize that only four surfaces are required to fully illuminate an object. A tetrahedral structure, having lasers 180 at each vertex and corresponding photodetectors 185 on each surface, may be adequate to measure the three-dimensional boundary of the object 170.

The above described embodiment of the present invention is suitable for determining boundaries of many convex objects. For objects containing concavities, however, the device 100 may be unable to adequately resolve the cavities.

Figure 2:
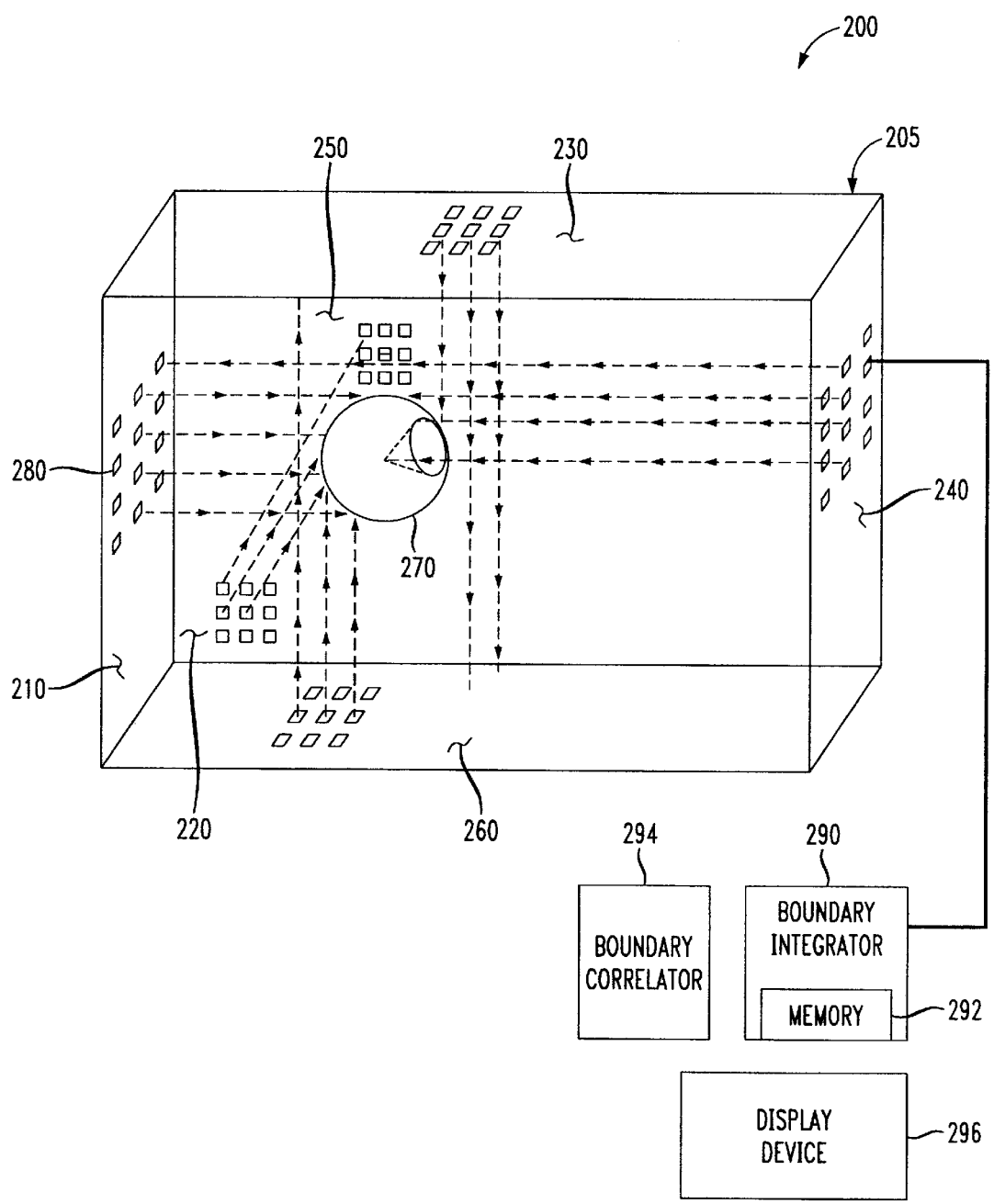
FIG. 2 illustrates another embodiment of a boundary determination device constructed according to the principles of the present invention.

Turning now to FIG. 2, illustrated is another embodiment of a boundary determination device 200 constructed according to the principles of the present invention. The device 200 includes a cubical structure 205 having first, second, and third orthogonal side surfaces 210, 220, 230, and corresponding opposing fourth, fifth, and sixth surfaces 240, 250, 260, respectively. An object 270, having concavities therein, is located within the device 200.

The first, second, third, fourth, fifth, and sixth surfaces 210, 220, 230, 240, 250, 260 contain sensors that gather energy reflected from the object 270. In the illustrated embodiment, the sensors are laser rangefinders (one of which is labeled 280), arranged in planar grids. Conventional laser rangefinders 280 measure the distance to a target by determining the time required for a pulse of laser energy to travel to the target, reflect from it, and return. Those skilled in the art are generally familiar with laser rangefinders 280.

The device 200 further includes a boundary integrator 290, coupled to the laser rangefinders 280. By combining distance information received from each laser rangefinder 280, the boundary integrator 290 may thus determine a three-dimensional convex boundary of the object 270. Since the laser rangefinders 280 are positioned on all inside surfaces of the structure 205, the device 200 is capable of detecting concavities in the convex boundary of the object 270.

The device 200 further includes a memory device 292 that contains stored convex boundary data. The device further includes a boundary correlator 294, coupled to the boundary integrator 290, that correlates the convex boundary of the object 270 with the stored convex boundary data. The device still further includes a display device 296, coupled to the boundary correlator 294 and boundary integrator 290, that displays a correlation between the convex boundary of the object 270 and the stored convex boundary data. The display device 296 may be a conventional screen or a virtual reality headset. A user may thus visually examine the object 270 in the device 200 and compare the convex boundary of the object 270 to stored convex boundary data from other objects.

Scientists studying insects, leaves, small fossils or other small static objects may find a small portable version of the device described above useful for quickly storing three-dimensional data regarding their respective subjects. The device could be used to classify immobile creatures (e.g. a biologist would like to quickly compare a previously unexamined immobile salamander found in the rain forest with other samples studied earlier), or objects in field settings (e.g. an anthropologist would like to compare the arrowhead she just found with a National Science Foundation database of previously discovered arrowheads from the same period). Additionally, the device may serve as an expert system or job aide to help scientists manage large amounts of information regarding their subjects.

Once the convex boundary data is stored, the scientist can review the data collected by re-playing the data visually, displaying the x, y, and z axes from any angle desired. Additionally, data collected in the field could be immediately compared with inter/intranet based databases of pre-assessed target objects, constrained by relevant variables (e.g. the type of soil in which the sample was found, or the type of objects found with the sample). Exploratory statistical techniques may also be used to identify previously unexplored relationships between the current object and other objects (e.g. massive data mining).

Figure 3:
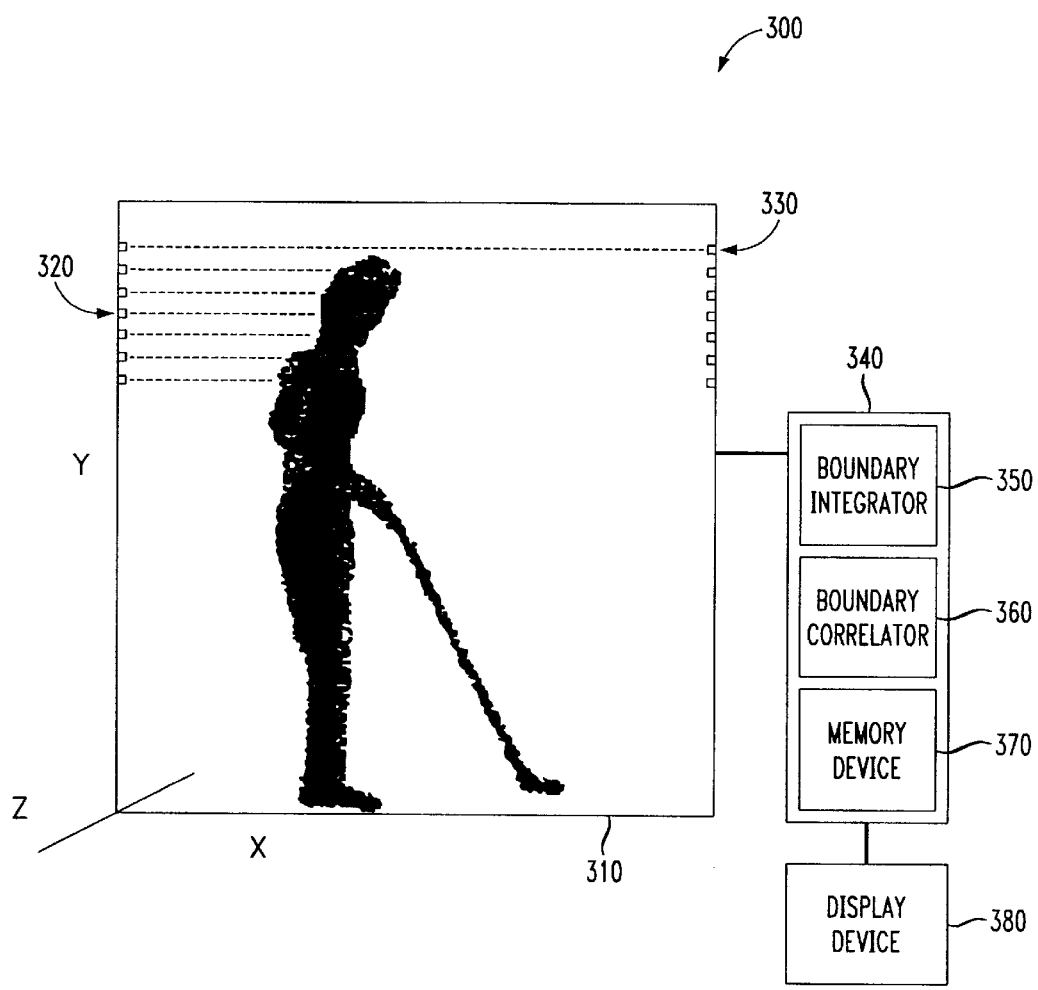
FIG. 3 illustrates a system for comparing golf putting stances, constructed according to the principles of the present invention.

Turning now to FIG. 3, illustrated is a system 300 for comparing golf putting stances, constructed according to the principles of the present invention. The system 300 allows amateur golfers to compare their golf putting stance with professional golfers (e.g., Arnold Palmer, Tiger Woods), in order to position their bodies in a more effective way. The system 300 includes a structure 310 of sufficient size for a person to stand comfortably inside, in typical golf stances. The system 300 further includes a grid of lasers (one of which is designated 320) and corresponding photodetectors (one of which is designated 330) mounted on each side of the structure 310. The lasers 320 and photodetectors 330 on each side of the structure 310 may be offset from the lasers 320 and photodetectors 330 on the opposing walls.

The system 300 further includes a computer 340 having a boundary integrator 350, a boundary correlator 360, and a memory device 370. The boundary integrator 350 receives signals from the photodetectors 330 and combines the signals to develop therefrom a convex boundary of a golfer that may then be stored in the memory device 370. To train amateur golfers, the boundary correlator 360 may correlate a convex boundary of an amateur golfer with stored convex boundary data of a professional golfer. The system 300 further includes a display device 380, coupled to the computer 340, that displays the correlation between the convex boundary of the amateur golfer and the stored convex boundary data of the professional golfer.

A golfer, standing inside the structure 310 in a putting stance, blocks light beams from a number of lasers 320 from reaching the corresponding photodetectors 330. The golfer, therefore, creates shadows in different dimensions that can be combined by the boundary integrator 350 to yield an indication of the golfer's overall convex boundary. To eliminate distraction to the golfer, the lasers 320 may use a spectrum of light that is not visible to the human eye. While the illustrated embodiment employs lasers 320 and photodetectors 330, the use of other types of sensors (e.g., laser rangefinders) is well within the broad scope of the present invention. Of course, the spectrum of the lasers 320 may vary depending on the application. In a preferred embodiment, studies of human behavior may incorporate lasers that use a spectrum of light invisible to the human eye and are cool enough to not be detected. The assessment, therefore, may be completely unobtrusive. For studies of animal behavior, however, the spectrum of light should be selected such that it is invisible to the animal's eyes. For studies of mechanical behavior, however, invisibility may not be a determining factor. Inexpensive lasers that use light spectra which do not interfere with the machine's normal operation should be selected (considering heat and energy use).

Before the system 300 may be used to train amateur golfers, fuzzy membership functions associated with baseline behavior of professional golfers must be established. One way to generate the fuzzy membership function associated with a particular golfer is to have the golfer stand inside the structure 310 holding a putter as if he were about to hit a golf ball on a flat stretch about 8 feet from the hole. The system 300 then stores convex boundary data associated with the particular golfer in the memory device 370. If the process is repeated many times, a fuzzy membership function may be generated by averaging the golfer's stance across the many trials. The precise number of trials may be based on a sampling plan, a statistical power analysis, or pre-defined conventions, to ensure that the fuzzy membership function can robustly generalize to the population of golf stance behavior for each golfer.

Once the golf stance behavior for a particular golfer is known to the system 300, amateur golfers can compare their own stances with that of the professional golfer. The system 300, therefore, compares the amateur golfer's behavioral profile with that of the professional golfer by calculating a fuzzy index of dissimilarity (FIDS) between currently observed behavior and the pre-established baseline behavior.

In a preferred embodiment, an amateur golfer's three-dimensional fuzzy set A includes elements a, wherein each element a represents whether a particular point in space inside the structure 310 is occupied by the amateur golfer. A professional golfer's three-dimensional fuzzy set P includes elements p, wherein each element p is a fuzzy membership value derived from repeated trials. The fuzzy membership value may be derived by conventional statistical methods and represents the likelihood that a particular point in space inside the structure 310 is occupied by the professional golfer. In the illustrated embodiment, each element a is either a logic one or zero and each element p ranges from 0 to 1 in real numbers.

The fuzzy membership values for one Z axis slice of an averaged three dimensional matrix is illustrated for A greater than 0.80. The shape of the larger fuzzy membership functions may look much like a crude picture of a golfer hunching over with a putter. The areas that are more likely to vary slightly, such as the positioning of the club itself, may contain fewer contiguous fuzzy membership values greater than 80, thereby making the "picture" messy.

The boundary correlator 360 may then calculate the fuzzy index of dissimilarity (FIDS) by summing the absolute value of the difference between the professional golfer's fuzzy set P and the amateur golfer's fuzzy set A.

$$\text{Fuzzy Index of Dissimilarity (FIDS)} = \Sigma |P_{xyz} - A_{xyz}|$$

A low FIDS indicates that the amateur golfer's stance is similar to the professional golfer's stance.

Of course, different people have different body types. The FIDS calculation, therefore, must also perform mathematical transformations to remove aspects of the golfers' bodies (e.g. torso, head shape, height) that are unimportant to their golf stance so as to reduce error variance in the FIDs comparisons. One approach is for the system 300 to collect demographic data about the amateur golfer (e.g., height, weight, and body type) and to match key portions of the amateur golfer's physique with analogous portions of the professional golfer through linear interpolation of the fuzzy membership values.

The system 300 may give the amateur golfer real-time three dimensional feedback, thus training the amateur golfer to stand exactly like a particular professional golfer when putting. The amateur golfer first selects a professional golfer's stance to model. Next, the amateur golfer is given a display device 380, for example, a virtual reality headset with positioning receptors. The display device 380, in a preferred embodiment, may superimpose a color-coded version of the professional golfer's averaged three dimensional fuzzy set P over the amateur golfer's body (e.g. legs). Values in the professional golfer's fuzzy set P greater than 0.90 may be appear as yellow, 0.89 to 0.75 as orange, and 0.74 to 0.50 as red. While the amateur golfer is in the structure 310, additional stimuli (e.g., musical tones) may be used. The addition of auditory tones as a feedback mechanism may be helpful for experimenting with different bodily positions that are difficult or impossible to see.

The system 300 may be even more helpful in mastering physical or manual skills, if it can incorporate the assessment, categorization, and feedback of motions. Golfers would love to compare their swings with the pros; molecular biology doctoral students would like to master the manual skill of injecting DNA into cells for cloning; students of baseball would like to learn how to swing like Willie Mays; police academy trainees would like to compare their takedown style with expert police instructors; and classical Thai dancers would like to copy the exotic movements of their masters. Additionally, persons requiring physical rehabilitation or occupational therapy may also benefit from such a system to re-learn how to walk, feed themselves, and perform other activities of daily living and working.

To determine motion, the system 300 may, for instance, sample signals from the photodetectors 330 thirty times per second. The boundary integrator 350 then repeatedly combines the signals to determine changes in the convex boundary over time. Each set of convex boundary data may then be recorded as a new matrix in the memory device 370. If the system 300 samples at a rate of 30 times per second, the resulting fidelity may be similar to that of conventional video recordings. This process is similar in concept to the process used in recording a movie—still pictures are taken every fraction of a second that, when displayed together, give the appearance of motion.

The sampling procedure may be repeated multiple times to develop three dimensional fuzzy sets of a targeted behavior to be assessed or modeled. For example, to record a professional golfer's ability to drive a golf ball, the system 300 would begin recording just before he starts to back swing, and end recording when both his arms have followed through the ball and remain immobile behind his head.

The sampling may occur across many trials, just as in the case of static behavior classification. In one embodiment of the present invention, cells in each matrix may be recalculated by a weighted mean, using the mean of analogous cells in previous samplings:

[(Mean)N+New cell value]/N+1

Each new sampling session, therefore, toggles an overall number of assessments N to N+1. After a sufficiently large number of trials, again determined by a sampling plan, statistical power analysis, or convention, all three dimensional matrices will have values ranging from 0 to 1, resulting in fuzzy membership functions. The fuzzy membership functions allow automatic, unobtrusive classification, assessment and simulation of behavior. Of course, additional algorithms may be needed to compare and classify new behavior against pre-established/pre-recorded behavioral categories.

From the above, it is apparent that the present invention provides a device for determining at least a portion of a convex boundary of an object and a method of operating the same to determine the convex boundary or motion thereof. In one embodiment, the device includes: (1) first, second and third sensors, locatable about the object, that scan the object in corresponding first, second and third dimensions and produce signals indicating boundary sections in corresponding first, second and third planes and (2) a boundary integrator, coupled to the first, second and third sensors, that combines the signals to develop therefrom the convex boundary.

Although the present invention has been described in detail, those skilled in the art should understand that they can make various changes, substitutions and alterations herein without departing from the spirit and scope of the invention in its broadest form.

What is claimed is:

1. A device for determining at least a portion of a three-dimensional boundary of an object, comprising:

first, second and third sensors, locatable about said object, that gather only energy transmitted past said object in corresponding first, second and third dimensions and produce signals indicating boundary sections in corresponding first, second and third planes; and a boundary integrator, coupled to said first, second and third sensors, that combines said signals to develop therefrom said convex boundary.

2. The device as recited in claim 1 wherein each of said first, second and third sensors comprises a grid of sensing elements.

3. The device as recited in claim 1 wherein said boundary integrator repeatedly combines said signals to determine changes in said convex boundary over time, said device capable of determining motion of said object.

4. The device as recited in claim 1 further comprising:

a memory device that contains stored convex boundary data; and a boundary correlator that correlates said convex boundary with said stored convex boundary data.

5. The device as recited in claim 4 further comprising a display device that displays a correlation between said convex boundary and said stored convex boundary data.

6. A method of determining at least a portion of a three-dimensional convex boundary of an object, comprising the steps of:

gathering only energy transmitted past said object in corresponding first, second and third dimensions to produce signals indicating boundary sections in corresponding first, second and third planes; and combining said signals to develop therefrom said convex boundary.

7. The method as recited in claim 6 wherein said step of gathering comprises the step of activating first, second and third grids of sensing elements.

8. The method as recited in claim 6 wherein said step of combining is carried out repeatedly to reveal changes in said convex boundary over time and thereby determine motion of said object.

9. The method as recited in claim 6 further comprising the steps of:

containing stored convex boundary data in a memory device; and correlating said convex boundary with said stored convex boundary data.

10. The method as recited in claim 9 further comprising the step of displaying a correlation between said convex boundary and said stored convex boundary data.

11. A device for determining motion of a three-dimensional object, comprising:

first, second and third light sensors, locatable about said object, that gather only light transmitted past said object in corresponding first, second and third dimensions and produce signals indicating boundary sections in corresponding first, second and third planes; and a boundary integrator, coupled to said first, second and third light sensors, that repeatedly combines said signals to determine changes in said convex boundary over time.

12. The device as recited in claim 11 further comprising first, second and third lasers corresponding to said first, second and third light sensors and wherein each of said first, second and third light sensors comprises a grid of light sensing elements.

13. The device as recited in claim 11 further comprising:

a memory device that contains stored convex boundary data; and a boundary correlator that correlates said convex boundary with said stored convex boundary data.

14. The device as recited in claim 13 further comprising a display device that displays a correlation between said convex boundary and said stored convex boundary data.

* * * * *